United States Patent Office 3,279,343
Patented Oct. 18, 1966

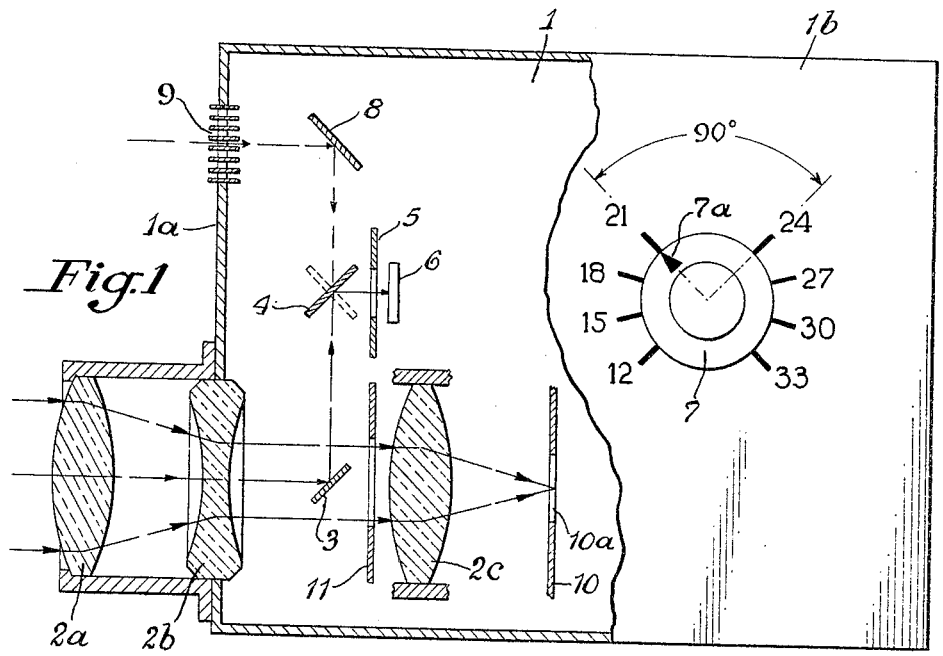
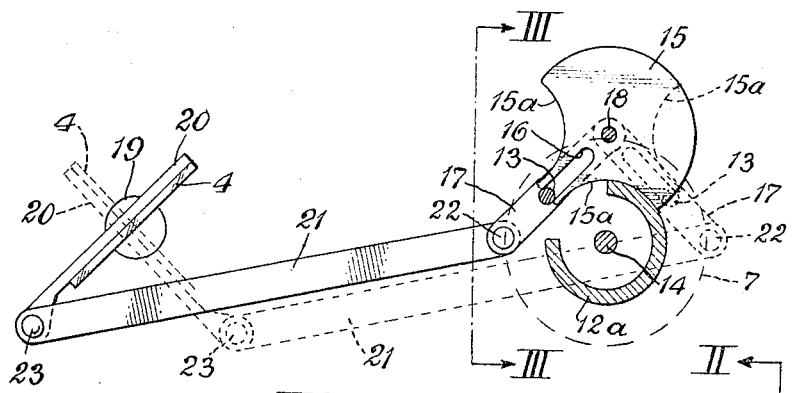
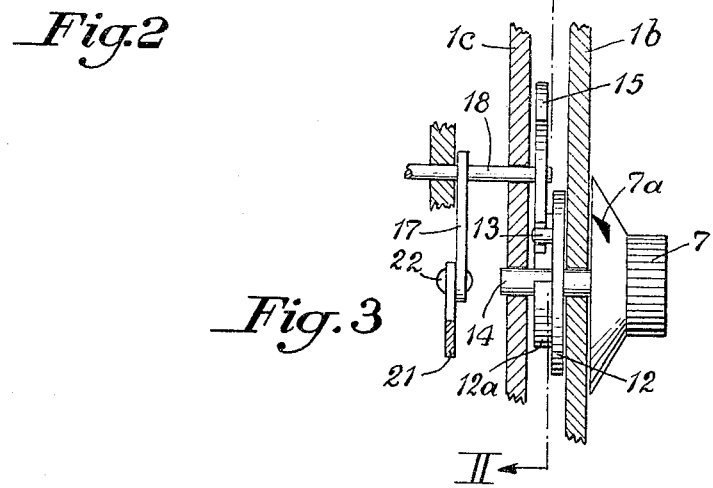

3,279,343
EXPOSURE MEASUREMENT AND CONTROL DEVICE FOR PHOTOGRAPHIC AND CINEMATOGRAPHIC CAMERAS
Martin Ploke, Kiel, and Heinz Ulffers, Kiel-Wik, Germany, assignors to Zeiss Ikon Aktiengesellschaft, Stuttgart, Germany
Filed July 22, 1963, Ser. No. 296,810
Claims priority, application Germany, July 24, 1962,
Z 9,554
3 Claims. (Cl. 95—10)

The invention relates to an exposure measuring device and a control mechanism therefor, and particularly relates to such devices which are built into a photographic camera or a motion picture camera.

Exposure measuring devices of the type mentioned are preferably so constructed and arranged that the light required for the measurement passes through the objective. The known arrangements for measuring light, however, furnish such a small amount of light that the known photoelectric receivers can be employed only for working with relatively insensitive films. The fact is that in the case of light intensities which are low and yet well receivable by films of high sensitivity, the inertia of the photo effect in these receivers and a distortion of the measuring value through the dark resistance dependent upon the pre-exposure become noticeable. Due to these influences the reliability of the exposure measurement in this range of light intensity is questionable.

There are known other exposure measuring devices and control mechanisms therefor which operate with light which, after passing through a measuring angle limiting device, is directed directly upon the photoelectric receiver. In such a device the light beam has a larger cross-section as compared with a measuring ray beam which is taken from the light beam passing through the camera objective. Such a light beam of larger cross section has, of course, a higher intensity. This type of measurement, however, has certain well known disadvantages as compared with the measurement by a light beam which has passed through a camera objective.

It is an object of the invention to provide an exposure measuring device and a control mechanism therefor which combines the advantages of a light measurement using the light passing through the camera objective and of one which produces a greater measuring accuracy for smaller light intensities by using a measuring angle limiting device.

In accordance with the invention, this object is obtained in that the exposure measuring device and control mechanism therefor employ first of all a measuring ray which is taken from the light beam passing through the camera objective, while secondly the same device may employ another measuring beam which passes through a measuring angle limiting device so that in fact the exposure measurement may be made selectively by the camera objective or by the measuring angle limiting device.

Another object of the invention is to arrange the photoelectric receiver movably in the camera casing or to associate the same with movable diaphragms, mirrors or the like in such a manner that the measuring light beam may be taken from the light beam passing through the camera objective or from the separate light beam passing through a measuring angle limiting device.

With these and other objects in view the invention will now be described with reference to the accompanying drawings showing an example of the exposure measuring device and control mechanism of the invention.

In the drawings:

FIG. 1 illustrates diagrammatically an exposure measuring device and control mechanism therefor positioned within a photographic camera, and FIG. 2 illustrates the coupling device arranged between a pivotally mounted mirror and a film speed adjusting knob in a sectional view along the line II—II of FIG. 3;

FIG. 3 is a sectional view along the line III—III of FIG. 2, and

Figure 4:
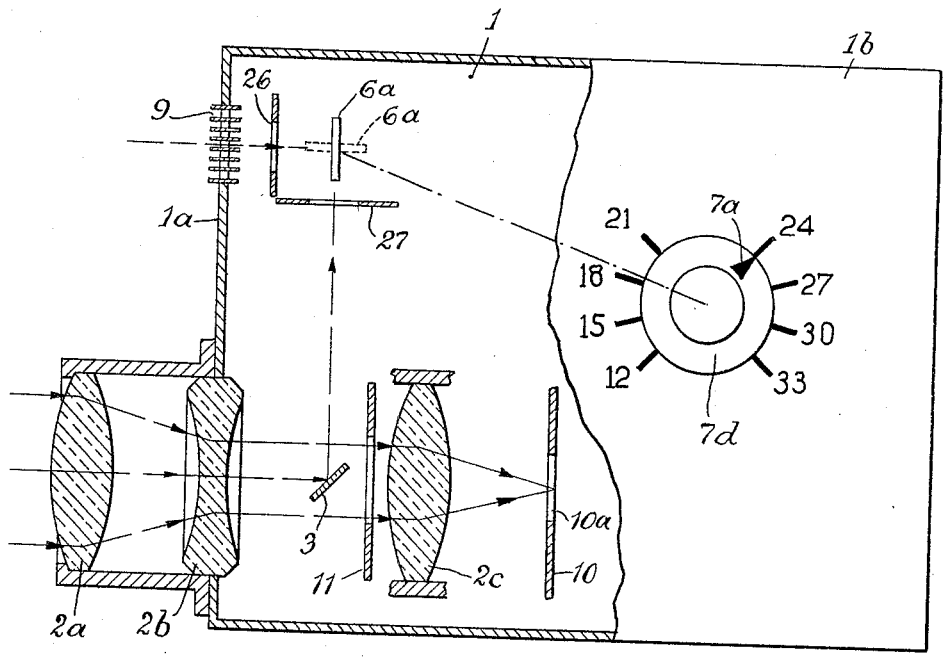
FIG. 4 is a view similar to FIG. 1, but shows a device with a pivotally mounted photoelectric receiver.

Referring to FIG. 1, the casing 1 of the photographic camera is provided with a camera objective comprising a plurality of axially spaced and aligned lenses 2a, 2b and 2c. Between the two lenses 2b and 2c of this camera objective is arranged a mirror 3 in such a manner that it reflects a portion of the light beam passing through the camera objective laterally outwardly and onto a pivotally mounted mirror 4. The latter reflects the mentioned portion of the light beam horizontally onto a photoelectric receiver 6 in front of which is arranged an adjustable diaphragm 5. The camera is provided with an exteriorly adjustable knob 7 permitting an adjustment to a number of film speeds. The front wall 1a of the camera casing 1 has mounted therein a measuring angle limiting device 9 which directs some of the light coming from the object to be photographed onto a reflecting mirror 8 within the camera casing and the mirror 8 reflects the light onto the previously mentioned mirror 4, provided the same is in proper position. This mirror 4 again reflects the light coming from the mirror 8 onto the photo-electric receiver 6. The camera objective and the measuring angle limiting device have the same angle of view. In rear of the camera objective and in the casing 1 is arranged a plate 10 with a picture window 10a. This plate 10 supports the film to be exposed. Furthermore, an objective diaphragm 11 is arranged between the mirror 3 and the rearmost lens 2c of the camera objective.

The knob 7 for adjusting the film speed is provided with a mark 7a which is movable along a stationary uniformly calibrated film speed scale indicating film speeds of 12, 15, 18 and 21° DIN. Between the indicating lines for 21° DIN and 24° DIN is arranged an angle of 90°. When the knob 7 is rotaated about this angle of 90° from 21° to 24° DIN, this causes the adjustment of the mirror 4 about an angle of 90°, namely from the position shown in a solid line to the position shown in dotted lines. During the additional adjustments of the knob 7 from 24° DIN to any one of the calibrations indicating 27°, 30° and 33° DIN the mirror 4 remains in the same position. The calibrations between the latter indicating lines are uniformly spaced in the same manner as they are within the range from 12 to 21° DIN.

If exposures are to be made on a film having a sensitivity or speed of 18° DIN, the adjusting knob 7 is moved with its mark 7a opposite the film speed 18°. The pivotally mounted mirror 4 will be in the position indicated in solid lines and will reflect a measuring ray beam coming from the mirror 3 onto the photoelectric receiver 6.

When film exposures are to be made during unfavorable light conditions and films having a normal or a low speed can no longer be used, the previously described disadvantages of a measurement by means of light coming from the photographic objective will occur. For this reason the adjusting knob 7 is coupled with the pivotally mounted mirror 4 in such a manner that when the knob 7 is adjusted from 21° to 24° DIN, the mirror 4 is rotatably shifted into the position indicated by dash lines, i.e., the mirror is pivoted substantially about an angle of 90°. It is, of course, necessary that now a film of a higher speed be used in the camera, for instance a speed of 24° to 33° DIN. During the adjustment of the knob 7 to any one of these higher speed values the pivotally mounted mirror 4 remains in the adjusted position which is assumed when the knob 7 was adjusted to 24°. Now a light beam having a substantially increased intensity, namely an intensity which is a multiple of the intensity of the beam branched off from the beam passing through the camera objective, passes through the measuring angle limiting device 9 and to the mirror 8 by which it is reflected to the pivotally mounted mirror 4 and from there to the photoelectric receiver 6.

During this type of measurement, as well as during a measurement with light coming from the camera objective, the different DIN film speed values are introduced in known manner by an adjustment of the aperture of the diaphragm 5 into the exposure measuring device and its control mechanism, respectively.

It is, however, also possible to introduce the different DIN film speed values into the exposure measuring device by a suitable adjustment of the photoelectric receiver 6.

The details of the coupling device between the adjusting knob 7 and the pivoted mirror 4 are illustrated in the FIGS. 2 and 3 of which FIG. 3 is a sectional view along line II—II of FIG. 2. The knob 7 is fixedly mounted on a shaft 14 supported in the outer wall 1b of the camera and an inner wall 1c spaced from the outer wall 1b. The shaft 14 has fixedly mounted thereon a disc 12 provided with a concentric projection 12a and a laterally extending pin 13. Another shaft 18 is mounted in the camera casing parallel to the shaft 14 and has fixedly mounted thereon a cam disc 15 provided with two adjacent curved recesses 15a and a radial slot 16 into which projects the pin 13 on the disc 12. The shaft 18 also has fixedly mounted thereon a lever arm 17 whose outer end is pivotally connected at 22 with one end of a coupling rod 21 whose other end is connected pivotally at 23 to the outer end of a plate 20. The plate 20 carries the mirror 4 and is pivotally supported between its ends by a shaft 19. FIG. 2 illustrates in full lines the position of the coupling device when the mirror 4 reflects light rays coming from the mirror 3 onto the receiver 6, while the dash lines indicate the position of the coupling device and the mirror 4 when the latter reflects light rays coming from the mirror 8 and reflects the same onto the receiver 6.

The operation of the coupling device is as follows: The tilting of the mirror 4 from the position 21° DIN to the position 24° DIN takes place by rotating the knob 7. The pin 13 on the disc 12, which engages the slot 16 of the disc 15, effects a rotation of the latter. The disc 15 in turn rotates the shaft 18 and the latter operates the lever arm 17, the rod 21 and the plate 20 to tilt the latter with the mirror thereon about an angle of 90° into the position illustrated in dash lines in FIG. 2. In the two end positions of the pivoted mirror 4 the outer circumference of the concentric projection 12a enters the curved recess 15a and engages the concave wall thereof and thereby the pivoted mirror 4 is maintained in the desired end position. The knob 7, however, may be further rotatably adjusted to the other film speed positions from 24° DIN to 33° DIN and, of course, after the return of the mirror 4 to the end position 21° DIN the knob 7 may be adjusted to the other lower film speed positions from 21° DIN to 12° DIN.

FIG. 4 shows an embodiment of the invention in which the photoelectric receiver is movably mounted in the camera casing. It will be noted that the mirrors 4 and 8 employed in the embodiment of FIG. 1 are omitted. The mirror 8 is replaced by a pivotally mounted photoelectric receiver 6a which is operatively coupled with the adjusting knob 7d by a coupling device which is constructed in the same manner as the one shown in the FIGS. 2 and 3. The arrangement of the photoelectric receiver 6a in its two selective end positions is such that the measuring light rays passing through the measuring angle limiting device 9 and being reflected by the mirror 3 will alway impinge perpendicularly upon the photoelectric receiver 6a. Furthermore, a diaphragm 26 is arranged between the measuring angle limiting device 9 and the photoelectric receiver 6a and another diaphragm 27 is arranged between the mirror 3 and the photoelectric receiver 6a.

What we claim is:

1. An exposure measurement device for photographic cameras and motion picture cameras employing the camera objective, a measuring angle limiting device and a photoelectric receiver, including means for reflecting selectively a portion of the light beam passing through said camera objective and a light beam passing through said measuring angle limiting device onto said photoelectric receiver, said comera objective and said measuring angle limiting device having the same angle of view, and the intensity of the beam of light passing through said measuring angle limiting device being a multiple of the intensity of the measuring light derived from the beam of light passing through said camera objective and reflected onto said photoelectric receiver.

2. An exposure measurement device for photographic cameras and motion picture cameras employing the camera objective, a measuring angle limiting device and a photoelectric receiver, including means for reflecting selectively a portion of the light beam passing through said camera objective and a light beam passing through said measuring angle limiting device onto said photoelectric receiver, an adjusting knob for film speed values associated with a scale of low speed values and a scale of high speed values between which is provided an angle of 90°, and coupling means connecting said knob with said selective reflecting means, whereby said low speed values are associated with said portion of the light beam passing through said camera objective, while said high speed values are associated with said beam of light passing through said measuring angle limiting device.

3. An exposure measurement device for photographic cameras and motion picture cameras employing the camera objective, a measuring angle limiting device and a photoelectric receiver, including means for reflecting selectively a portion of the light beam passing through said camera objective and a light beam passing through said measuring angle limiting device onto said photoelectric receiver, said camera objective and said measuring angle limiting device having the same angle of view, and the intensity of the beam of light passing through said measuring angle limiting device being a multiple of the intensity of the measuring light derived from the beam of light passing through said camera objective and reflected onto said photoelectric receiver, an adjusting knob for film speed values associated with a scale of low speed values and a scale of high speed values between which is provided an angle of 90°, and coupling means connecting said knob with said selective reflecting means, whereby said low speed values are associated with said portion of the light beam passing through said camera objective, while said high speed values are associated with said beam of light passing through said measuring angle limiting device.

References Cited by the Examiner

UNITED STATES PATENTS

| 3,001,443 | 9/1961 | Stimson et al. | 95—100 X |
| 3,056,332 | 10/1962 | Beregowitz | 88—24 |
| 3,103,150 | 9/1963 | Lange | 95—10 |
| 3,109,356 | 11/1963 | Swarofsky et al. | 95—10 |
| 3,127,809 | 4/1964 | Denk | 352—141 |

FOREIGN PATENTS 1,280,609  11/1961  France.

NORTON ANSHER, *Primary Examiner.*

J. F. PETERS, Jr., *Assistant Examiner.*